United States Patent [19]

Chou

[11] Patent Number: 5,956,789
[45] Date of Patent: Sep. 28, 1999

[54] SCREWDRIVER WITH WIRE STRIPPER HANDLE

[76] Inventor: Paul Chou, 24, Alley 96, Lane 158, Cheng Kong Rd., Ho Lee Hsiang, Taichung Hsien, Taiwan

[21] Appl. No.: 08/977,631

[22] Filed: Nov. 25, 1997

[51] Int. Cl.⁶ .............................. B25B 25/00; H02G 1/12
[52] U.S. Cl. .................................... 7/108; 81/9.4; 30/90.1
[58] Field of Search ..................... 30/125, 90.1; 7/108; 81/9.4

[56] References Cited

U.S. PATENT DOCUMENTS

| 2,546,489 | 3/1951  | Wright        | 7/108  |
| 2,620,692 | 12/1952 | Marshall, III | 81/9.4 |
| 4,607,544 | 8/1986  | Jewell, Jr.   | 81/9.4 |
| 5,732,471 | 3/1998  | Korinek et al.| 30/90.6 |

Primary Examiner—David A. Scherbel
Assistant Examiner—Philip J. Hoffmann
Attorney, Agent, or Firm—Bacon & Thomas

[57] ABSTRACT

A screwdriver has a handle provided with a spring-biased press block secured within a recess of the handle for movement towards and away from a bottom of the recess. The press block and bottom of the recess are each provided with cooperating wire clamping and terminal clamping bodies for respectively stripping insulation from the wire and securing a terminal to a stripped end of the wire.

3 Claims, 4 Drawing Sheets

SCREWDRIVER WITH WIRE STRIPPER HANDLE

FIELD OF THE INVENTION

The present invention relates generally to a hand tool, and more particularly to an improved screwdriver which can be also used as a tool for stripping and connecting the wires.

BACKGROUND OF THE INVENTION

The conventional screwdriver has only one function of turning screws. A worker is required to carry with him or her many different hand tools for doing a variety of chores. In general, the worker often finds it rather annoying and inconvenient to have to carry various hand tools on the job. Under such a circumstance, the work efficiency of the worker is bound to be seriously undermined.

SUMMARY OF THE INVENTION

The primary objective of the present invention is therefore to provide an improved screwdriver capable of multifunctions of turning screws, stripping wires and connecting the wire terminals.

In keeping with the principle of the present invention, the foregoing objective of the present invention is attained by a multipurpose screwdriver consisting mainly of a shank and a handle. The shank is provided at the free end thereof with a tip for turning a screw. The handle is provided with a wire stripping apparatus and a wire-terminal connecting apparatus.

The foregoing objective, features and functions of the present invention will be more readily understood upon a thoughtful deliberation of the following detailed description of an embodiment of the present invention with reference to the accompanying drawings.

BRIEF DESCRIPTION OF THE DRAWINGS

FIG. 6 shows another schematic view of the present invention in use.

DETAILED DESCRIPTION OF THE PREFERRED EMBODIMENT

Figure 1:
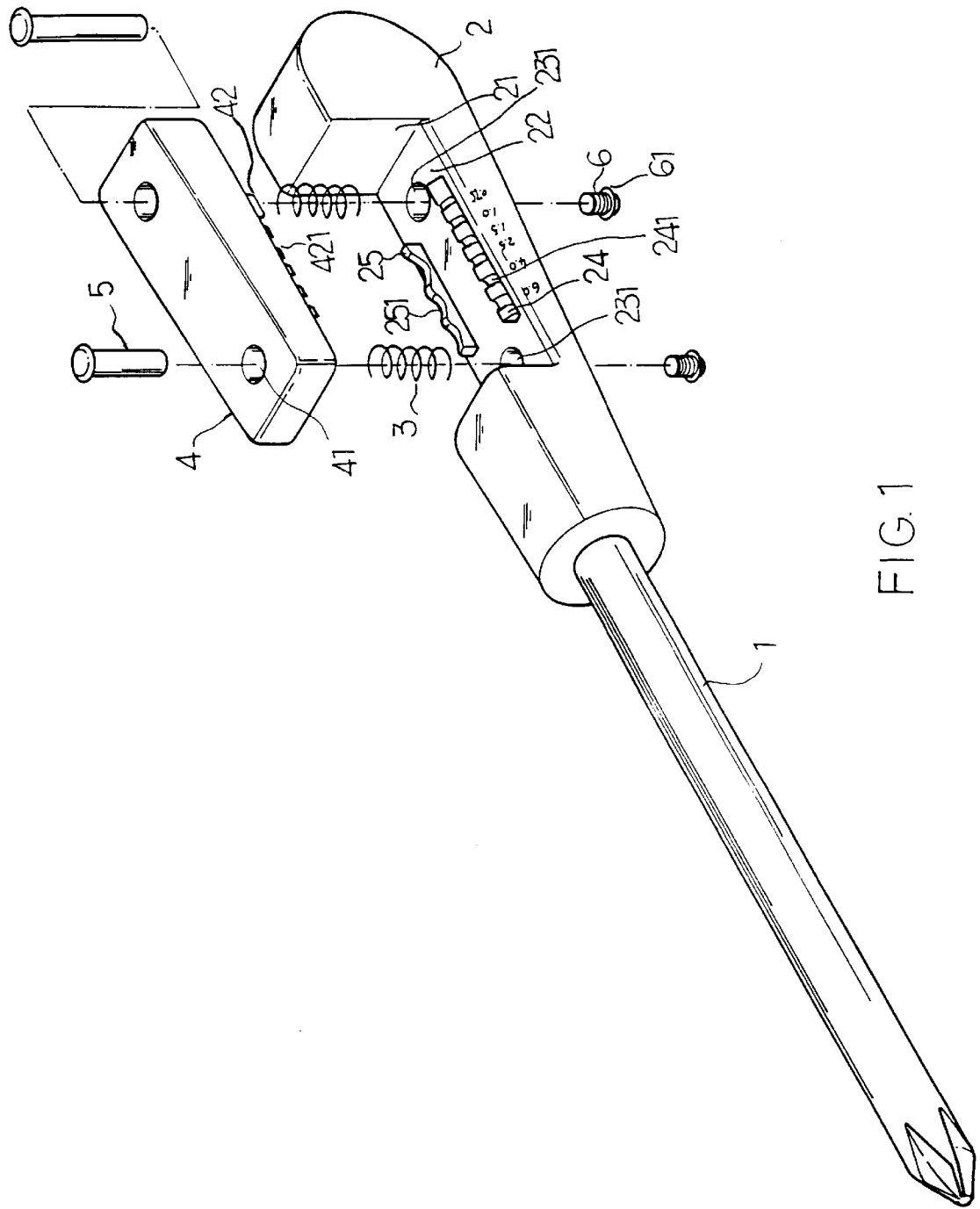
FIG. 1 shows an exploded perspective view of the present invention.
Figure 2:
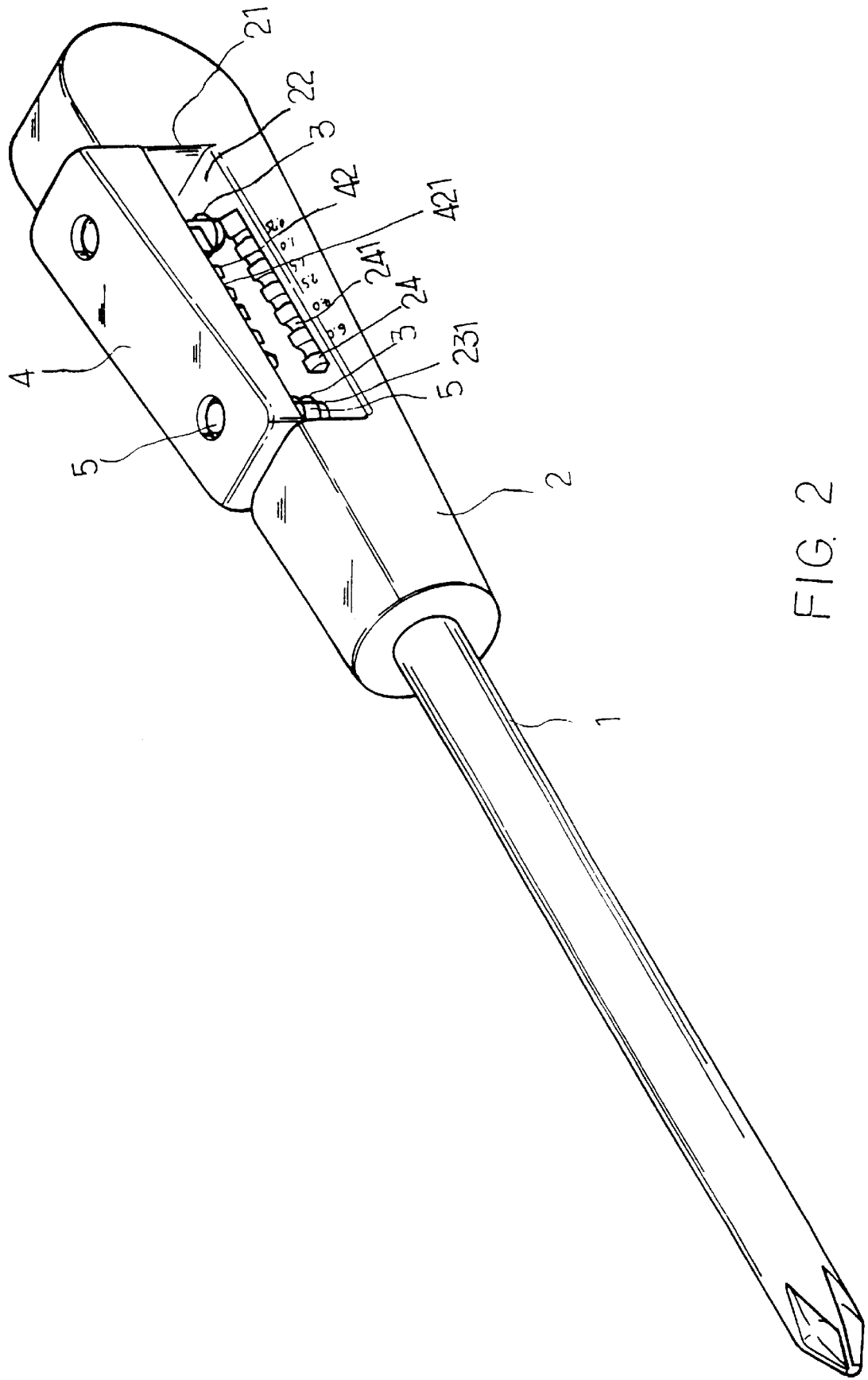
FIG. 2 shows a perspective view of the present invention in assembled form.
Figure 3:
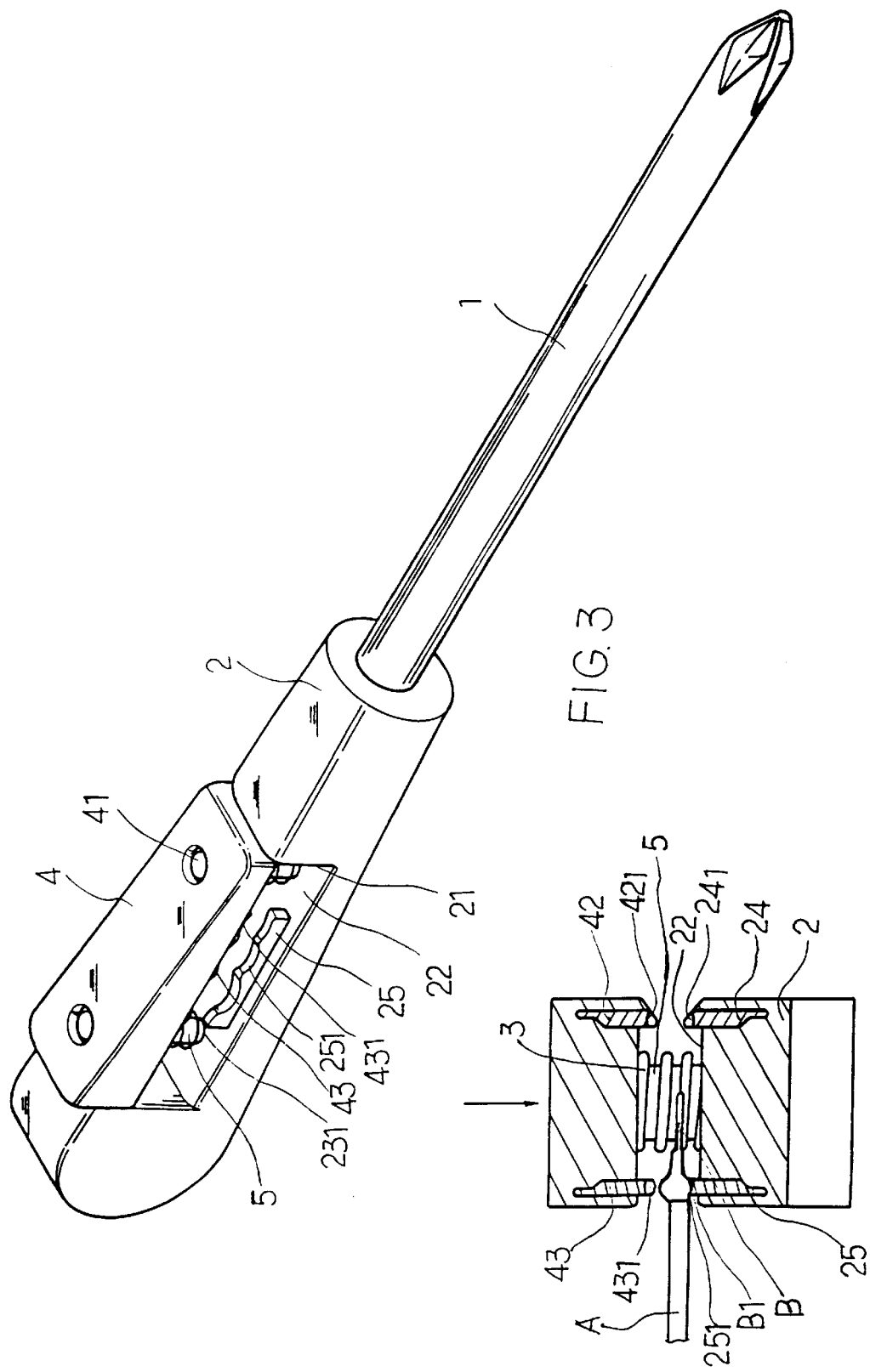
FIG. 3 shows another perspective view of the present invention in assembled form.
Figure 4:
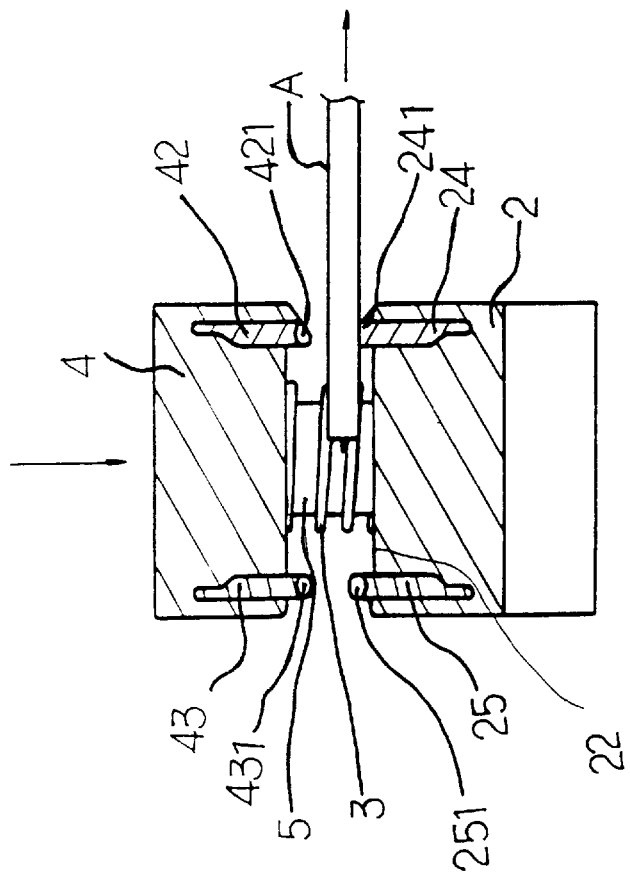
FIG. 4 shows a partial sectional view of the present invention.

As shown in FIGS. 1–4, a screwdriver embodied in the present invention is composed mainly of a shank 1, and a handle 2. The shank 1 is provided at the free end thereof with a tip for turning screws. The main feature of the screw of the present invention is the handle 2, which is described explicitly hereinafter.

The handle 2 is fastened at one end thereof with the shank 1 and is provided with a recess 21. The recess 21 has a flat bottom 22, which is provided with two through holes 23. The upper portion of the inner wall of each of the two through holes 23 is provided with a round slot 231 having a diameter greater than the inner diameter of the rest of the through hole 23. A coil spring 3 is accommodated in the round slot 231. The lower portion of the inner wall of each such through hole 23 is provided with a circular inwardly directed arresting edge 232. The bottom 22 of the recess 21 is further provided with a lower wire clamping body 24 having a plurality of stripping teeth 241. The bottom 22 of the recess 21 is further provided with a lower terminal clamping body 25 parallel to the lower wire clamping body 24. The lower terminal clamping body 25 has a plurality of arcuate depressions 251.

The handle 2 is further provided with a press block 4 corresponding in length and width to the bottom 22 of the recess 21 of the handle 2. The press block 4 is provided with two fish eye through holes 41 corresponding in location to the through holes 23 of the bottom 22 of the recess 21. The press block 4 is provided in the underside thereof with an upper wire clamping body 42 corresponding in location to the lower wire clamping body 24 of the bottom 22 of the recess 21. The upper wire clamping body 42 has a plurality of stripping teeth 421. The press block 4 is further provided in the underside thereof with an upper terminal clamping body 43 corresponding in location to the lower terminal clamping body 25 of the bottom 22 of the recess 21. The upper terminal clamping body 43 has a plurality of arcuate depressions 431.

The press block 4 is joined with the recess 21 by two bolts 5 and two nuts 6 engageable with the bolts 5. The bolts 5 are received in the through holes 23 of the recess 21 and the fish eye through holes 41 of the press block 4. The bolts 5 have a threaded hole 51, whereas the nuts 6 have a threaded rod engageable with the threaded hole 51 of the bolts 5. The nuts 6 further have a head 61 which can be stopped by the circular arresting edge 232 of the through hole 23. The coil spring 3 is fitted into the bolt 5. As a result, the press block 4 is urged by the two coil springs 3.

Figure 5:
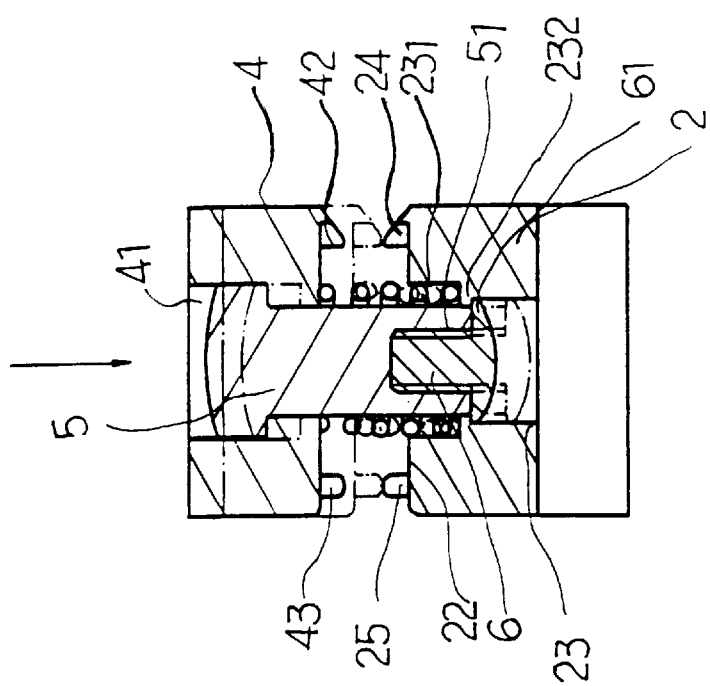
FIG. 5 shows a schematic view of the present invention in use.

As illustrated in FIG. 5, a wire "A" can be stripped of its sheath by the screwdriver of the present invention. In operation, one end of the wire "A" is located on the stripping teeth 241 of the lower wire clamping body 24. After the press block 4 is pressed, the stripping teeth 421 of the upper wire clamping body 42 firmly secures the end of the wire "A". As the wire "A" is pulled out in the direction away from the stripping teeth 241 and 421, the sheath of the wire "A" is stripped off. When the press block 4 is relieved of the external force exerted thereon, the press block 4 is forced back to its original position by the coil springs 3.

As illustrated in FIG. 6, the wire "A" can be connected with a terminal "B" by the screwdriver of the present invention. In operation, a fitting tube "B1" of the terminal "B" is located on a selected arcuate depression 251 of the lower terminal clamping body 25 of the recess 21 of the handle 2. The stripped end of the wire "A" is then inserted into the fitting tube "B1" of the terminal "B". The press block 4 is then pressed such that both the stripped end of the wire "A" and the fitting tube "B1" of the terminal "B" are held securely and deformed by the corresponding depression 431 of the lower terminal clamping body 43 of the press block 4. The wire "A" is thus connected with the terminal "B". As the press block 4 is relieved of the external force exerted thereon, the press block 4 is forced by the coil springs 3 to return to its original position.

The embodiment of the present invention described above is to be deemed in all respects as being merely illustrative and not restrictive. Accordingly, the present invention may be embodied in other specific forms without deviating from the spirit thereof. The present invention is therefore to be limited only by the scope of the following appended claim

What is claimed is:

1. A screwdriver comprising:

a shank having a first free end and a second end the first end provided with a tip for turning screws;

a handle fastened to the second end;

a recess having a bottom formed in the handle, said handle further provided with a press block corresponding in size to said bottom of said recess, said press block and said bottom of said recess each provided respectively with a plurality of through holes for receiving a plurality of fastening bolts for holding said press block in said recess, a plurality of coil springs fitted over said bolts for urging said press block away from the bottom of said recess, and said press block can be forced by an external force to move in a direction towards said bottom of said recess, and further that said press block is capable of being forced by said coil springs to return to an original position in a direction away from the bottom of said recess at such time when said press block is relieved of the external force exerting thereon, said bottom of said recess and an underside of said press block each being provided respectively and correspondingly with a wire clamping body for stripping the wire and a terminal clamping body for connecting a stripped end of the wire with a terminal.

2. The screwdriver as defined in claim 1, wherein said wire clamping body of said bottom of said recess and said wire clamping body of said underside of said press block are each provided with a plurality of corresponding stripping teeth capable of cooperating with each other.

3. The screwdriver as defined in claim 1, wherein said terminal clamping body of said bottom of said recess and said terminal clamping body of said press block are each provided with a plurality of corresponding arcuate depressions capable of cooperating with each other.

* * * * *